US007434232B2

(12) United States Patent
Pettigrew (10) Patent No.: US 7,434,232 B2
(45) Date of Patent: Oct. 7, 2008

(54) SYSTEM AND METHOD FOR WRITING TO A DRIVE WHEN AN APPLICATION LACKS ADMINISTRATOR PRIVILEGES

(75) Inventor: David Pettigrew, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 790 days.

(21) Appl. No.: 10/702,586

(22) Filed: Nov. 7, 2003

(65) Prior Publication Data
US 2005/0102680 A1 May 12, 2005

(51) Int. Cl.
G06F 9/46 (2006.01)
G06F 15/16 (2006.01)

(52) U.S. Cl. .................... 719/321; 719/327; 709/229; 709/250

(58) Field of Classification Search ........... 719/321, 719/327; 709/229, 250
See application file for complete search history.

(56) References Cited

U.S. PATENT DOCUMENTS

| 5,239,532 | A | 8/1993 | Hensing et al. | |
|---|---|---|---|---|
| 6,014,718 | A | 1/2000 | Kurihara | |
| 6,301,206 | B1 | 10/2001 | Nomura et al. | |
| 6,449,652 | B1* | 9/2002 | Blumenau et al. | 709/229 |
| 2002/0059372 | A1* | 5/2002 | Goshev et al. | 709/203 |
| 2002/0059517 | A1* | 5/2002 | Haviv et al. | 713/154 |
| 2003/0072029 | A1* | 4/2003 | Wiley | 358/1.15 |
| 2003/0120836 | A1* | 6/2003 | Gordon | 710/22 |
| 2004/0193744 | A1* | 9/2004 | Paley et al. | 710/5 |
| 2004/0199763 | A1* | 10/2004 | Freund | 713/154 |
| 2005/0193235 | A1* | 9/2005 | Sandorfi et al. | 714/6 |
| 2007/0118888 | A1* | 5/2007 | Styles | 726/5 |

FOREIGN PATENT DOCUMENTS

| EP | 1049012 A | 11/2000 |
|---|---|---|
| EP | 1199874 A | 4/2002 |

OTHER PUBLICATIONS

Galen C Hunt: "Creating User-Mode Device Drivers with a Proxy"; Proceedings of the Usenix Windowx NT Workshop, Aug. 11, 1997.
Anonymous: "IOCTL_SCSI_PASS_THROUGH" OSRONLINE.COM, Apr. 11, 2003. Retrieved from the Internet.
Anonymous: "SCSI_PASS_THROUGH" OSRONLINE.COM, Apr. 11, 2003. Retrieved from the Internet.
European Search Report; Application No. EP 04011436; filed May 13, 2004; report issued Jul. 20, 2007.

* cited by examiner

Primary Examiner—Meng-Ai An
Assistant Examiner—Abdou K Seye (57) ABSTRACT

A system and method are provided which enable a user of a computer application without administrator privileges to write to a drive without using a third party driver and without using a customized driver acting in conjunction with an IDE bus. The system includes a driver programming interface in communication with the application, a service proxy in communication with the driver interface, a service with administrator privileges in communication with the service proxy, a driver in communication with the service with administrator privileges, and a drive in communication with the driver.

34 Claims, 4 Drawing Sheets

SYSTEM AND METHOD FOR WRITING TO A DRIVE WHEN AN APPLICATION LACKS ADMINISTRATOR PRIVILEGES

BACKGROUND

To write (also referred as "print") to a disc in a CD drive, an interface is needed to allow an imaging application to send data to the drive. In a personal computer ("PC") with a Windows operating system ("OS"), access to the CD drive is usually done through the cdrom.sys class driver. Interfacing with the class driver requires very low level programming and is not an easy way for an imaging application to send to send print data.

Figure 1A:
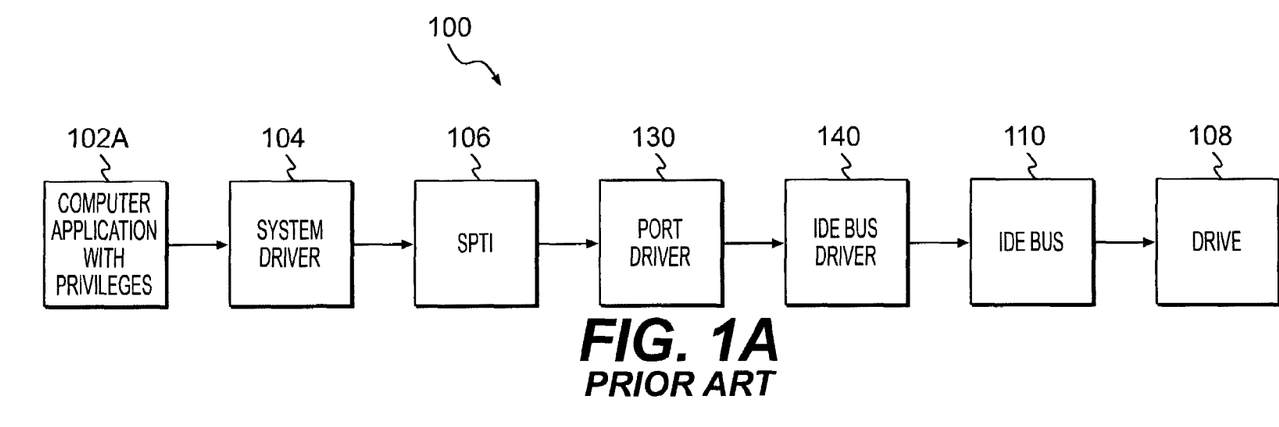
FIG. 1A is a schematic diagram of a standard operating system in which an application is being run with administrator privileges and is able to send write commands to a drive.
Figure 1B:
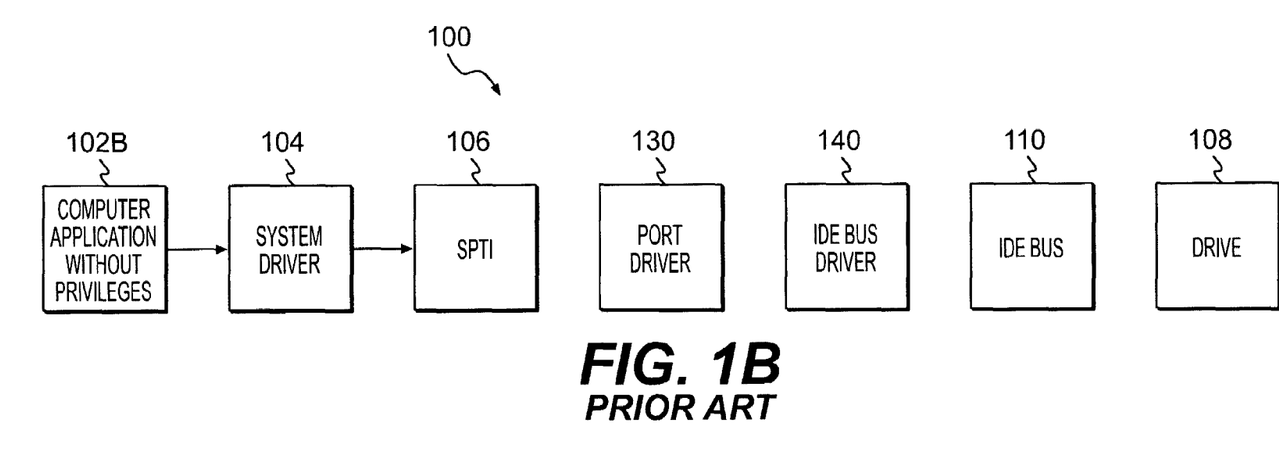
FIG. 1B is a schematic diagram of a standard operating system in which an application is being run without administrator privileges and is unable to send write commands to a drive.

As shown in FIGS. 1A and 1B, a standard computer system 100 includes a CD-ROM drive 108 which is modified to support printing and is programmed to recognize specific small computer system interface/attachment packet interface ("SCSI/ATAPI") commands that are only used for printing. In this system 100, a Windows application 102 (shown as "102A" and "102B") interfaces with an OS class driver 104 using input/output control ("IOCTL") language. However, because these commands are non-standard, it is necessary to bypass error checking protocols. Accordingly, the traditional approach is to use an SCSI-pass-through-interface ("SPTI") 106 interfaced with the OS driver 104.

As shown in FIG. 1A, if the Windows application 102 is an application with administrator privileges 102A (i.e., the user has administrator privileges and this status is recognized by the system 100), when using an SPTI 106, the class driver 104 passes the raw print command data to the CD drive 108 via a port driver 130, an intelligent drive electronics (also known as "integrated drive electronics" or "IDE") bus driver 140, and an IDE bus 110; the SPTI does not interfere with or check the data. The driver 104 confirms the administrator privileges status before sending signals to the SPTI. For those applications with administrator privileges 102A, the SPTI will send SCSI/ATAPI print commands to the CD drive 108. By way of contrast, as shown in FIG. 1B, if the application does not have administrator privileges 102B (i.e., the user does not have administrator privileges and this status is recognized by the system 100), this status information is also passed to the driver 104; as a result, the driver 104 will not send print signals to the SPTI which, in turn, prevents the signals from reaching the CD drive 108.

As a result, to use an SPTI, an application must have administrator privileges (i.e., the user must have administrator privileges). However, as most PC users, particularly those on a network, do not have administrator privileges, the SPTI is usually unavailable, thereby preventing print commands from reaching the CD drive 108.

Figure 2:
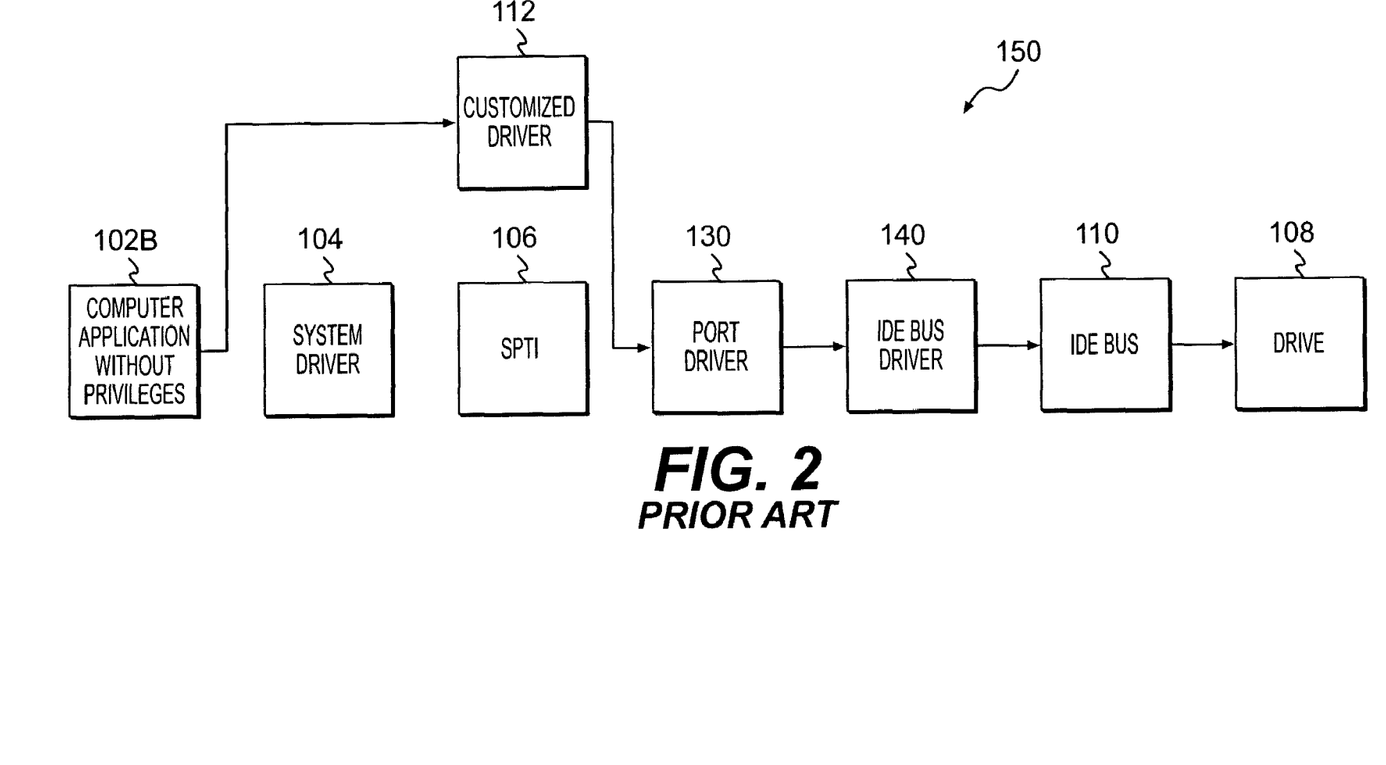
FIG. 2 is a schematic diagram of a first prior art system enabling an application without administrator privileges to write to a drive.

There are two predominant prior solutions to this administrator access problem. First, as shown in FIG. 2, another system 150 has been developed using an IDE bus 110 but not using standard SCSI commands or drivers. This system 150 uses a second, customized driver 112 to control the data and control lines of the IDE bus 110 to send print data to the CD drive 108.

Unfortunately, as a result of using specialized commands to overcome the print access problem associated with no administrator privileges, this system 150 does not support standard drivers such as the class driver 104 that is already a part of the OS. As a result, the second driver 112 is necessary to act as an interface between the application without administrator privileges 102B and the IDE bus 110 via the port driver 130 and IDE bus driver 140. The second driver 112 may receive the same print commands as the OS driver 104 or may receive specialized print commands as a result of being interfaced with the custom driver. However, the second driver 112 is customized to convert the driver commands of the application 102B into non-SCSI commands which are sent through the bus 110 to the CD drive 108.

Figure 3:
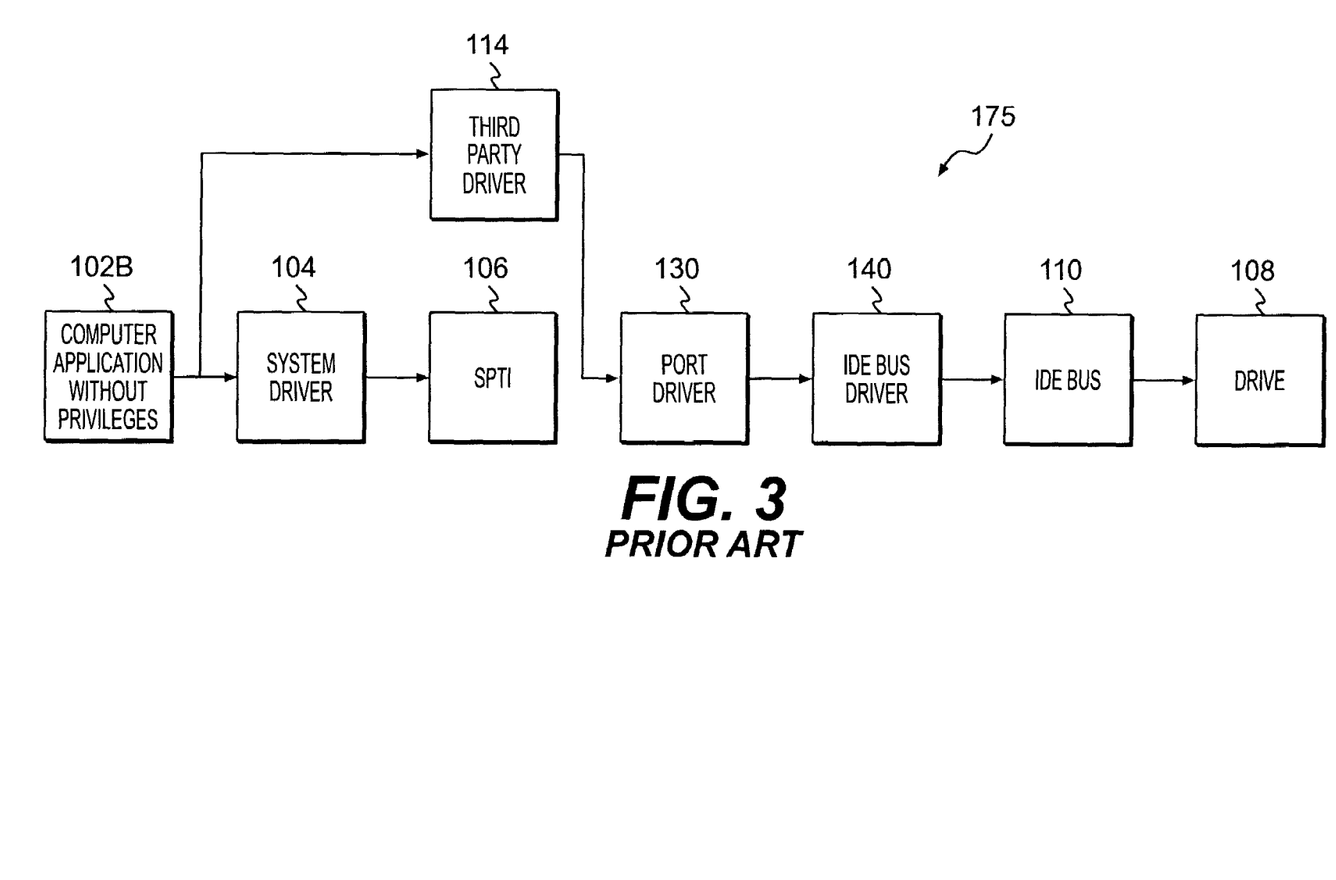
FIG. 3 is a schematic diagram of a second prior art system enabling an application without administrator privileges to write to a drive.

The second solution, shown in FIG. 3, involves a system 175 which, like the standard OS shown in FIG. 1A, uses SCSI commands to control the CD drive 108. However, in this system 175, the SCSI commands reach the CD drive 108 via a third party CD driver 114 that is not part of the OS. An example of such a driver is the Advanced SCSI Programming Interface ("ASPI"). Unfortunately, third party drivers require license fees and have limited technical support in current operating systems. It should be recognized that in this system, the application without administrator privileges 102B interfaces with the system driver 104, the SPTI 106, and the third party driver 114. The OS driver 104 and the third party driver 114 receive the same print commands and unlike the previously described systems (in which administrator status signals were communicated to the system driver 104), in this system 175, the status signals are communicated to the SPTI 106. However, like the previously described system 150, the SPTI 106 is bypassed; in this system 175, the bypass is via the third party driver 114.

SUMMARY

One embodiment of the invention is a system and method which enable a user of a computer application without administrator privileges to write to a drive without using a third party driver and without using a customized driver acting in conjunction with an IDE bus. The system includes a driver programming interface in communication with the application, a service proxy in communication with the driver interface, a service with administrator privileges in communication with the service proxy, a driver in communication with the service with administrator privileges, and a drive in communication with the driver.

These and other features, aspects, and advantages of the present invention will become more apparent from the following description, appended claims, and accompanying exemplary embodiments shown in the drawings.

DETAILED DESCRIPTION

One embodiment of the invention comprises a system for sending write commands to a drive from a computer application lacking administrator privileges. This system includes: (a) a computer application lacking administrator privileges; (b) a driver programming interface in communication with the computer application; (c) a service proxy in communication with the driver programming interface; (d) a service with administrator privileges in communication with the service proxy; (e) a driver in communication with the service with administrator privileges, wherein the driver is either in communication with an SPTI or is configured in SPTI mode; and (f) a drive in communication with the SPTI or with the SPTI configured driver.

Another embodiment of the invention comprises a method of sending write commands to a drive from a computer application which does not have administrator privileges. This method includes: (a) transmitting write commands between a computer application which does not have administrator privileges and a driver programming interface; (b) transmitting second commands based at least in part on the write commands between the driver programming interface and a service proxy; (c) transmitting third commands based at least in part on the second commands between the service proxy and a service with administrator privileges; (d) transmitting fourth commands based at least in part on the third commands between the service with administrator privileges and a driver; (e) transmitting fifth commands based at least in part on the fourth commands between the driver and an SPTI; and (e) transmitting sixth commands based at least in part on the fifth commands between the SPTI and a drive.

Another embodiment of the invention comprises a method of sending write commands to a drive from a computer application which does not have administrator privileges, the method comprising the steps of: (a) transmitting write commands between a computer application which does not have administrator privileges and a driver programming interface; (b) transmitting second commands based at least in part on the write commands between the driver programming interface and a service proxy; (c) transmitting third commands based at least in part on the second commands between the service proxy and a service with administrator privileges; (d) transmitting fourth commands based at least in part on the third commands between the service with administrator privileges and a driver configured in SPTI mode; and (e) transmitting fifth commands based at least in part on the fourth commands between the driver and a drive.

Another embodiment of the invention comprises a program product for sending write commands to a drive from a computer application which does not have administrator privileges. The program product includes machine-readable program code stored on a computer-readable medium for causing, when executed, a machine to perform the following method: (a) transmitting write commands between a computer application which does not have administrator privileges and a driver programming interface; (b) transmitting second commands based at least in part on the write commands between the driver programming interface and a service proxy; (c) transmitting third commands based at least in part on the second commands between the service proxy and a service with administrator privileges; (d) transmitting fourth commands based at least in part on the third commands between the service with administrator privileges and a driver; (e) transmitting fifth commands based at least in part on the fourth commands between the driver and an SPTI; and (f) transmitting sixth commands based at least in part on the fifth commands between the SPTI and a drive.

Reference will now be made in detail to various embodiments of the invention, which are illustrated in the drawings. An effort has been made to use the same reference numbers throughout the drawings to refer to the same or like parts.

Figure 4:
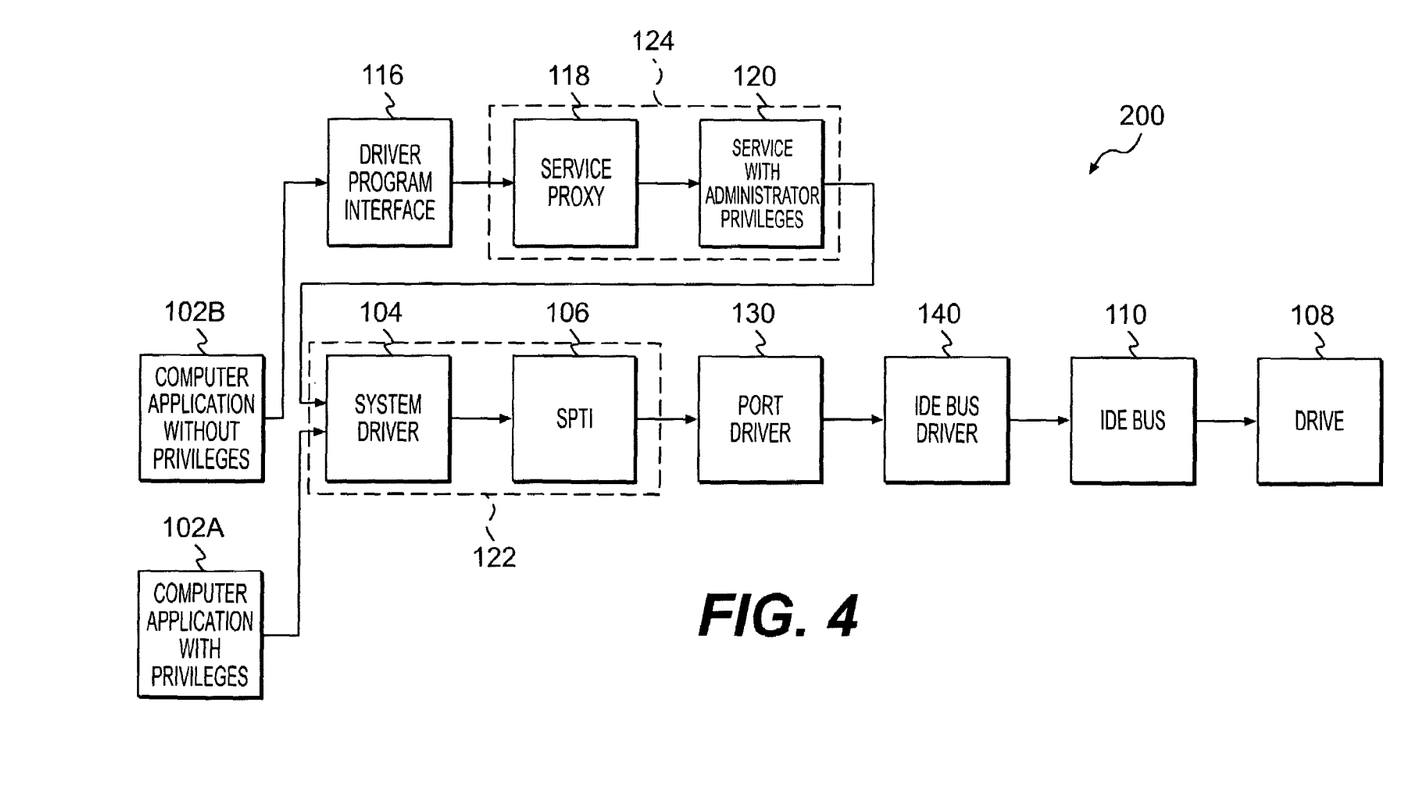
FIG. 4 is a schematic diagram of one embodiment of a system which enables an application without administrator privileges to write to a drive without using a second, customized driver working in conjunction with a IDE bus and without using a third party driver.

FIG. 4 shows a schematic diagram of a system 200 which enables an application without administrator privileges 102B to write to a drive without using a second, customized driver 112 working in conjunction with a IDE bus 110 and without using a third party driver 114. The embodiment shown describes a CD drive interface comprising a computer application without administrator privileges 102B, a driver program interface 116, a service proxy 118, a service with administrator privileges 120, and OS driver 104, an SPTI 106, and a CD drive 108.

The computer application without administrator privileges 102B may be, for example, a Windows application. This application 102B transmits commands (e.g., write commands) to the driver programming interface 116 by means of a high level language.

The driver programming interface 116 is the top level interface which uses the service proxy 118 to communicate with the CD drive 108. The driver interface 116 provides write/print specific commands that allow the imaging components to read information about the drive 108 and media, and to send settings, as well as actual image data to be printed, to the drive 108. The driver programming interface 116 interprets the high level language commands from the application 102B and communicates with the service proxy 118 by means of high level language ("HLL") and/or application programming interface ("API") language.

The service proxy 118 abstracts the need to use inter-process communication ("IPC") mechanisms for an application without administrator privileges 102B to communicate with the service with administrator privileges 120. Upon recognizing the lack of administrator privileges, the proxy 118 provides generic commands to the service with administrator privileges 120.

The commands transmitted by the service proxy 118 direct the service with administrator privileges 120 to send an input, output, or status (e.g., is the drive running) commands to the drive 108. An input command is a command where the driver 104 wants to read some information from the drive 108 such as the media parameters. An output command is a command such as sending a track of pixel data to the drive 108. The service proxy 118 may also provide standard mechanisms to find all print capable drives on the local system, get a description and drive letter for the drives, send commands to open and close a particular drive for printing, send commands giving the driver 104 an exclusive lock on the drive 108, etc.

To send these commands, the service proxy 118 interfaces with the service with administrator privileges 120. The service with administrator privileges 120 provides administrator access to the driver 104 and is programmed to use the SPTI mode of the class driver 104. Accordingly, in communicating with the driver 104, the service with administrator privileges 120 uses SCSI-pass-through ("SPT") direct and/or IOCTL commands, i.e., the service with administrator privileges 120 is programmed to send corresponding low-level commands to the drive 108 via the SPTI 106.

As shown, the driver 104 and the SPTI 106 may be separate. In this case, the driver 104 communicates with the SPTI and the SPTI communicates with the drive 108 by means of SCSI commands. By way of contrast, the drive 104 could be combined in a driver 122 configured in SPTI mode in which case the driver 122 could communicate directly with the drive 108 by means of SCSI commands.

Similarly, as shown the service proxy 118 and the service with administrator privileges 120 may be separate. However, it should be recognized that the service proxy 118 and the service with administrator privileges 120 may be combined into one integrated device 124.

It also should be recognized that if the computer application is an application with administrator privileges 102A, the system 200 will work much like the system 100 shown in FIG. 1A. In addition, implicit in this system 200 is an assumption that the firmware for the drive 108 is programmed to recognize the SCSI commands it receives as writing/printing commands.

The aforementioned system and method of transferring data to a disc provide numerous advantages. For example, the system allows an imaging system to communicate with an optical disc drive, without having to deal with the low-level complexities of SCSI drivers. By way of another example, the system does not require the user to have administrator privileges to access the drive through the SPTI 106. In addition, by using standard OS components and thereby eliminating the need for a new driver, the system: (a) does away with the licensing costs associated with using a third party CD-ROM driver that is not part of the operating system; and (b) does not require certification by the Microsoft Hardware Quality lab.

Although the aforementioned describes embodiments of the invention, the invention is not so restricted. It will be apparent to those skilled in the art that various modifications and variations can be made to the disclosed embodiments of the present invention without departing from the scope or spirit of the invention. Accordingly, these other systems and methods of transmitting write commands from an application without administrator privileges to a drive are fully within the scope of the claimed invention. Therefore, it should be understood that the apparatus and method described herein are illustrative only and are not limiting upon the scope of the invention, which is indicated by the following claims.

What is claimed is:

1. A system having a processor, comprising:
   a drive operable, responsive to non-standard print commands, to print pixels of image data on a disc removably inserted in the drive;
   a driver configured to communicate the non-standard print commands with the drive only if the non-standard print commands are received at the driver from a sender having administrator privileges;
   a computer application that lacks administrator privileges configured to send high level language commands;
   a driver programming interface configured to transmit the non-standard print commands via high level language and/or application programming interface function calls in response to the high level language commands received from the computer application;
   a service proxy that receives the non-standard print commands from the driver programming interface;
   a service having administrator privileges that receives the non-standard print commands from the service proxy and sends the print commands to the driver, wherein the driver is either in communication with a small-computer-system-interface-pass-through-interface ("SPTI") or is configured in SPTI mode, and wherein the SPTI or the SPTI configured driver sends the non-standard print commands to the drive to print the disc based on the administrator privileges of the service.

2. The system according to claim 1, wherein the service proxy is configured to communicate with the service having administrator privileges by means of an inter-process communication ("IPC").

3. The system according to claim 2, wherein the service having administrator privileges is configured to communicate with the driver using small-computer-system-interface-pass-through ("SPT") direct and/or input/output control ("IOCTL") language.

4. The system according to claim 3, wherein if the driver is in communication with the SPTI, the driver is configured to communicate with the SPTI using small-computer-system-interface ("SCSI") commands, and wherein if the driver is configured in SPTI mode, the driver is configured to communicate with the drive using SCSI commands.

5. The system according to claim 1, wherein the drive is an optical drive.

6. The system according to claim 5, wherein if the driver is in communication with the SPTI, the driver is configured to communicate with the optical drive using small-computer-system-interface ("SCSI") commands via the SPTI.

7. The system of claim 1, wherein the system is a single personal computer, and wherein the computer application, the driver programming interface, the service proxy, the service, the driver, and the drive are disposed in the personal computer.

8. The system of claim 7, wherein the personal computer runs a Windows operating system.

9. The system of claim 1, wherein the service proxy determines if the computer application lacks administrator privileges.

10. The system of claim 9, wherein the service proxy provides the non-standard print commands to the service having administrator privileges if the computer application lacks administrator privileges.

11. The system of claim 1, wherein the service proxy is external to the drive.

12. The system of claim 1, wherein the driver program interface generates the non-standard print commands.

13. The system of claim 1, wherein the computer application that lacks administrator privileges generates the non-standard print commands.

14. A method comprising the steps of:
    transmitting, between a computer application which does not have administrator privileges and a driver programming interface, high level language write commands for printing pixels of image data on a disc removably inserted in a drive;
    transmitting non-standard second commands based at least in part on the write commands between the driver programming interface and a service proxy using high level language and/or application programming interface function calls;
    transmitting non-standard third commands based at least in part on the second commands between the service proxy and a service having administrator privileges;
    transmitting non-standard fourth commands based at least in part on the third commands between the service having administrator privileges and a driver, wherein the driver is configured to communicate with a small-computer-system-interface-pass-through-interface ("SPTI") only if the non-standard fourth commands are received from a sender having administrator privileges;
    based on the administrator privileges of the service, transmitting non-standard fifth commands based at least in part on the fourth commands between the driver and the SPTI; and
    transmitting non-standard sixth commands based at least in part on the fifth commands between the SPTI and the drive to print the disc.

15. The method according to claim 14, wherein the step of transmitting third commands based at least in part on the second commands between the service proxy and a service having administrator privileges comprises:
    transmitting the third commands between the service proxy and the service having administrator privileges by means of an inter-process communication ("IPC").

16. The method according to claim 14, wherein the step of transmitting fourth commands based at least in part on the third commands between the service having administrator privileges and a driver comprises:
   sending input/output control ("IOCTL") commands from the service having administrator privileges to the driver.

17. The method according to claim 14, wherein the step of transmitting fifth commands based at least in part on the fourth commands between the driver and an SPTI comprises:
   sending small-computer-system-interface ("SCSI") signals from the driver to the SPTI.

18. The method according to claim 14, wherein the step of transmitting sixth commands based at least in part on the fifth commands between the SPTI and a drive comprises:
   sending small-computer-system-interface ("SCSI") signals front the SPTI to the drive.

19. The method according to claim 14, wherein the step of transmitting fifth commands based at least in part on the fourth commands between the driver and an SPTI comprises:
   sending small-computer-system-interface ("SCSI") signals from the driver to the SPTI,
   and wherein the step of transmitting sixth commands based at least in part on the fifth commands between the SPTI and a drive comprises:
   sending SCSI signals from the SPTI to the drive.

20. The method according to claim 14, wherein the drive is an optical drive.

21. The method of claim 14, wherein the service proxy determines if the computer application does not have the administrator privileges.

22. The method of claim 21, wherein the service proxy provides the third commands to the service with administrator privileges if the computer application does not have the administrator privileges.

23. The method of claim 14, wherein the computer application is an imaging application, wherein the write commands include the pixels of image data for printing on the disc in the drive, and wherein the sixth commands cause the pixels of image data to be printed on the disc.

24. A method comprising the steps of:
   transmitting, between a computer application which does not have administrator privileges and a driver programming interface, high level language write commands for printing pixels of image data on a disc removably inserted in a drive;
   transmitting non-standard second commands based at least in part on the write commands between the driver programming interface and a service proxy using high level language and/or application programming interface function calls;
   transmitting non-standard third commands based at least in part on the second commands between the service proxy and a service having administrator privileges;
   transmitting non-standard fourth commands based at least in part on the third commands between the service having administrator privileges and a driver configured in small-computer-system-interface-pass-through-interface ("SPTI") mode, wherein the driver is configured to communicate with the drive only if the non-standard fourth commands are received front a sender having administrator privileges;
   based on the administrator privileges of the service, transmitting non-standard fifth commands based at least in part on the fourth commands between the driver and the drive to print the disc.

25. The method according to claim 24, wherein the step of transmitting third commands based at least in part on the second commands between the service proxy and a service having administrator privileges comprises:
   transmitting the third commands between the service proxy and the service having administrator privileges by means of an inter-process communication ("IPC").

26. The method according to claim 24, wherein the step of transmitting fourth commands based at least in part on the third commands between the service having administrator privileges and a driver comprises:
   sending input/output control ("IOCTL") commands from the service having administrator privileges to the driver.

27. The method according to claim 24, wherein the drive is an optical drive.

28. A program product comprising a computer-readable medium that stores computer-readable program code for causing, when executed, a computer to perform the following method:
   transmitting, between a computer application which does not have administrator privileges and a driver programming interface, high level language write commands for printing pixels of image data on a disc removably inserted in a drive;
   transmitting non-standard second commands based at least in part on the write commands between the driver programming interface and a service proxy using high level language and/or application programming interface function calls;
   transmitting non-standard third commands based at least in part on the second commands between the service proxy and a service having administrator privileges;
   transmitting non-standard fourth commands based at least in part on the third commands between the service having administrator privileges and a driver, wherein the driver is configured to communicate with a small-computer-system-interface-pass-through-interface ("SPTT") only if the non-standard fourth commands are received from a sender having administrator privileges;
   based on the administrator privileges of the service, transmitting non-standard fifth commands based at least in part on the fourth commands between the driver and the SPTI; and
   transmitting non-standard sixth commands based at least in part on the fifth commands between the SPTI and the drive to print the disc.

29. The program product according to claim 28, wherein the step of transmitting third commands based at least in part on the second commands between the service proxy and a service having administrator privileges comprises:
   transmitting the third commands between the service proxy and the service having administrator privileges by means of an inter-process communication ("IPC").

30. The program product according to claim 28, wherein the step of transmitting fourth commands based at least in part on the third commands between the service having administrator privileges and a driver comprises:
   sending input/output control ("IOCTL") language from the service having administrator privileges to the driver.

31. The program product according to claim 28, wherein the step of transmitting fifth commands based at least in part on the fourth commands between the driver and an SPTI comprises:
   sending small-computer-system-interface ("SCSI") signals from the driver to the SPTI.

32. The program product according to claim 28, wherein the step of transmitting sixth commands based at least in part on the fifth commands between the SPTI and a drive comprises:

sending small-computer-system-interface ("SCSI") signals from the SPTI to the drive.

33. The program product according to claim 28, wherein the step of transmitting fifth commands based at least in part on the fourth commands between the driver and an SPTI comprises:
sending small-computer-system-interface ("SCSI") signals from the driver to the SPTI, and wherein the step of transmitting sixth commands based at least in part on the fifth commands between the SPTI and a drive comprises:
sending SCSI signals from the SPTI to the drive.

34. The program product according to claim 28, wherein the drive is an optical drive.

* * * * *

UNITED STATES PATENT AND TRADEMARK OFFICE
CERTIFICATE OF CORRECTION

PATENT NO. : 7,434,232 B2 Page 1 of 1
APPLICATION NO. : 10/702586
DATED : October 7, 2008
INVENTOR(S) : David Pettigrew It is certified that error appears in the above-identified patent and that said Letters Patent is hereby corrected as shown below:

In column 7, line 16, in Claim 18, delete "front" and insert -- from --, therefor.

In column 7, line 60, in Claim 24, delete "front" and insert -- from --, therefor.

In column 8, line 36, in Claim 28, delete "("SPTT")" and insert -- ("SPTI") --, therefor.

Signed and Sealed this

Eighteenth Day of August, 2009

David J. Kappos
*Director of the United States Patent and Trademark Office*